(12) United States Patent
Ahn

(10) Patent No.: US 11,109,435 B2
(45) Date of Patent: Aug. 31, 2021

(54) ELECTRONIC DEVICE AND METHOD FOR CONTROLLING ELECTRONIC DEVICE

(71) Applicant: Samsung Electronics Co., Ltd., Suwon-si (KR)

(72) Inventor: Sangwon Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/714,080

(22) Filed: Dec. 13, 2019

(65) Prior Publication Data

US 2020/0196366 A1 Jun. 18, 2020

(30) Foreign Application Priority Data

Dec. 17, 2018 (KR) .................... 10-2018-0163449

(51) Int. Cl.
| | |
|---|---|
| *H04W 76/15* | (2018.01) |
| *H04W 8/00* | (2009.01) |
| *H04W 48/16* | (2009.01) |
| *G16Y 30/00* | (2020.01) |
| *G16Y 10/80* | (2020.01) |
| *G16Y 40/30* | (2020.01) |

(52) U.S. Cl.
CPC ........... *H04W 76/15* (2018.02); *H04W 8/005* (2013.01); *H04W 48/16* (2013.01); *G16Y 10/80* (2020.01); *G16Y 30/00* (2020.01); *G16Y 40/30* (2020.01)

(58) Field of Classification Search
CPC ..... H04W 76/14; H04W 8/005; H04W 48/16; H04W 76/15; H04W 88/08; G16Y 30/00
See application file for complete search history.

(56) References Cited

U.S. PATENT DOCUMENTS

| | | | |
|---|---|---|---|
| 9,918,351 | B2 | 3/2018 | Kim et al. |
| 9,942,288 | B2 | 4/2018 | Jinguu et al. |
| 10,111,156 | B2 | 10/2018 | Patil et al. |
| 10,219,102 | B2 | 2/2019 | Jang et al. |
| 10,237,086 | B2 | 3/2019 | Pan |
| 2007/0025313 | A1 | 2/2007 | Bhagwat et al. |
| 2015/0121470 | A1 | 4/2015 | Rongo et al. |

(Continued)

FOREIGN PATENT DOCUMENTS

| | | |
|---|---|---|
| CN | 103959863 A | 7/2014 |
| CN | 105223815 A | 1/2016 |

(Continued)

OTHER PUBLICATIONS

International Search Report dated Apr. 16, 2020, issued in International Application No. PCT/KR2019/017901.

(Continued)

*Primary Examiner* — Keith Ferguson
(74) *Attorney, Agent, or Firm* — Jefferson IP Law, LLP

(57) ABSTRACT

A method for controlling an electronic device is provided. The method includes acquiring access point (AP) information to connect to an AP, scanning for a first external device that is to be connected to the AP, scanning for a second external device that is to be connected to the AP; transmitting, to a first external device that is identified from the scanning, the AP information and control information for causing the first external device to transmit the AP information to the second external device.

22 Claims, 13 Drawing Sheets

(56) References Cited

U.S. PATENT DOCUMENTS

| | | | |
|---|---|---|---|
| 2015/0327060 A1* | 11/2015 | Gilson | H04L 67/16 |
| | | | 726/7 |
| 2016/0036819 A1* | 2/2016 | Zehavi | H04W 4/70 |
| | | | 726/4 |
| 2016/0135115 A1 | 5/2016 | Patil et al. | |
| 2016/0381144 A1 | 12/2016 | Malik et al. | |
| 2017/0026195 A1 | 1/2017 | Pan | |
| 2017/0041083 A1 | 2/2017 | Kwon | |
| 2017/0202036 A1 | 7/2017 | Ko et al. | |
| 2018/0063673 A1 | 3/2018 | Jang et al. | |
| 2018/0152443 A1 | 5/2018 | Henrique Minatel et al. | |
| 2018/0176970 A1 | 6/2018 | Gupta et al. | |
| 2018/0249313 A1 | 8/2018 | She et al. | |
| 2019/0320407 A1* | 10/2019 | Goyal | H04L 41/5058 |

FOREIGN PATENT DOCUMENTS

| | | |
|---|---|---|
| CN | 107079251 A | 8/2017 |
| CN | 107548063 A | 1/2018 |
| CN | 107659930 A | 2/2018 |
| CN | 107787026 A | 3/2018 |
| CN | 108605279 A | 9/2018 |
| KR | 10-2017-0096081 A | 8/2017 |
| WO | 2013/078408 A1 | 5/2013 |
| WO | 2017/135750 A1 | 8/2017 |
| WO | 2017/205755 A1 | 11/2017 |

OTHER PUBLICATIONS

Chinese Office Action with English translation dated Jan. 5, 2021; Chinese Appln. No. 201911300842.8.

* cited by examiner

ELECTRONIC DEVICE AND METHOD FOR CONTROLLING ELECTRONIC DEVICE

CROSS-REFERENCE TO RELATED APPLICATION(S)

This application is based on and claims priority under 35 U.S.C. § 119(a) of a Korean patent application number 10-2018-0163449, filed on Dec. 17, 2018, in the Korean Intellectual Property Office, the disclosure of which is incorporated by reference herein in its entirety.

BACKGROUND

1. Field

The disclosure relates to an electronic device and a controlling method thereof. More particularly, the disclosure relates to an electronic device capable of reducing time that is required for connecting a plurality of devices to an access point and a controlling method thereof.

2. Description of Related Art

With the development of computer technology, communication technology, and home electronics technology, a service in which devices in a home and a factory are connected via a network and managed emerges, and this service has been spotlighted as a future-oriented technology.

More particularly, research on Internet of Things (IoT) technology which embeds a communication function in the Internet and connects to the Internet has been accelerated. A user may control various things without being affected by time and place, using a user interface (UI) provided in a mobile device, such as a smartphone.

In order to use an IoT device, it is first necessary to connect the IoT device to external Internet. The IoT device may be connected to the Internet via an access point.

The IoT device usually does not have a user interface, and it was common to connect IoT devices to an access point using a mobile device having a user interface, such as a smartphone.

In order to help the IoT device to be connected to the access point, a mobile device is connected to the IoT device to provide information needed for the access point connection. However, since the mobile device may only connect to one IoT device at a time (one-to-one connection), if there are a plurality of IoT devices, repetitive operations are required and it takes a very long time.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device that is capable of reducing time required for connecting a plurality of devices to an access point and a controlling method thereof.

Additional aspects will be set forth in part in the description which follows and, in part, will be apparent from the description, or may be learned by practice of the presented embodiments.

In accordance with an aspect of the disclosure, a method for controlling an electronic device is provided. The method includes acquiring access point (AP) information to connect to an AP, scanning for a first external device that is to be connected to the AP, scanning for a second external device that is to be connected to the AP, transmitting, to the first external device that is identified from the scanning, the AP information and control information for causing the first external device to transmit the AP information to the second external device.

The method may further include setting a transmission path to transmit the AP information to the first external device that is identified from the scanning and a plurality of external devices that include the second external device, and the transmitting may include transmitting the AP information and the control information to the first external device by identifying the second external device to which the AP information is to be transmitted by the first external device based on the set transmission path.

The setting may include acquiring information on a position of the plurality of external devices based on an intensity of a signal that is received from each of the plurality of external devices, and setting the transmission path based on the acquired information.

The setting may include acquiring information on a space to which each of the plurality of external devices belongs from an external server and setting the transmission path based on the acquired information.

The control information may include information on a plurality of other external devices to which the AP information is to be transmitted by the first external device.

The transmitting may include transmitting, to the first external device, the AP information, control information for causing the first external device to transmit the AP information to a second external device, and control information for causing the second external device to transmit the AP information to a third external device.

The method may further include, after transmitting the AP information and the control information to the first external device, transmitting, to a third external device, the AP information and control information for causing the third external device to transmit the AP information to a fourth external device.

The method according to an embodiment may further include displaying a user interface (UI) including a list of at least one external device that is identified from the scanning, and the transmitting may include, based on the first external device and the second external device being selected through the UI, transmitting the AP information and the control information to the first external device.

The method according to an embodiment may further include, based on predetermined information being received from the first external device and the second external device through the access point after transmitting the AP information and the control information, displaying information indicating that the first external device and the second external device are connected to the access point.

The transmitting may include transmitting prestored server connection information along with the AP information and the control information to the first external device.

The method may further include, based on predetermined information being received from the first external device and the second external device through the access point after transmitting the AP information and the control information, transmitting, to the first external device and the second external device, prestored server connection information through the access point.

In accordance with another aspect of the disclosure, an electronic device is provided. The electronic device includes a communicator, a memory configured to store at least one computer executable instruction, and at least one processor configured to execute the at least one computer executable instruction, and the at least one processor may be configured to acquire AP information to connect to an AP, scan for a first external device that is to be connected to the AP, scan for a second external device that is to be connected to the AP, and control the communicator to transmit, to the first external device that is identified from the scanning, the AP information and control information for causing the first external device to transmit the AP information to the second external device.

The at least one processor may set a transmission path to transmit the AP information to the first external device that is identified from the scanning and a plurality of external devices that include the second external device, and control the communicator to transmit the AP information and the control information to the first external device by identifying the second external device to which the AP information is to be transmitted by the first external device based on the set transmission path.

The at least one processor may acquire information on a position of the plurality of external devices based on an intensity of a signal that is received from each of the plurality of external devices, and set the transmission path based on the acquired information.

The at least one processor may acquire information on a space to which each of the plurality of external devices belongs from an external server and set the transmission path based on the acquired information.

The control information may include information on a plurality of other external devices to which the AP information is to be transmitted by the first external device.

The at least one processor may control the communicator to transmit, to the first external device, the AP information, control information for causing the first external device to transmit the AP information to a second external device, and control information for causing the second external device to transmit the AP information to a third external device.

The at least one processor may, after transmitting the AP information and the control information to the first external device, control the communicator to transmit, to a third external device, the AP information and control information for causing the third external device to transmit the AP information to a fourth external device.

The electronic device according to an embodiment further includes a display, and the at least one processor may control the display to display a user interface (UI) including a list of at least one external device that is identified from the scanning, and control the communicator to, based on the first external device and the second external device being selected through the UI, transmit the AP information and the control information to the first external device.

In accordance with another aspect of the disclosure, an electronic device is provided. The electronic device includes a display, and the at least one processor may, based on predetermined information being received from a first external device and a second external device through the access point after transmitting the AP information and the control information, control the display to display information indicating that the first external device and the second external device are connected to the access point.

The at least one processor may, based on predetermined information being received from the first external device and the second external device through the access point after transmitting the AP information and the control information, control the communicator to transmit, to the first external device and the second external device, prestored server connection information through the access point.

The at least one processor may control the communicator to transmit, to the first external device and the second external device, prestored server connection information through the access point.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
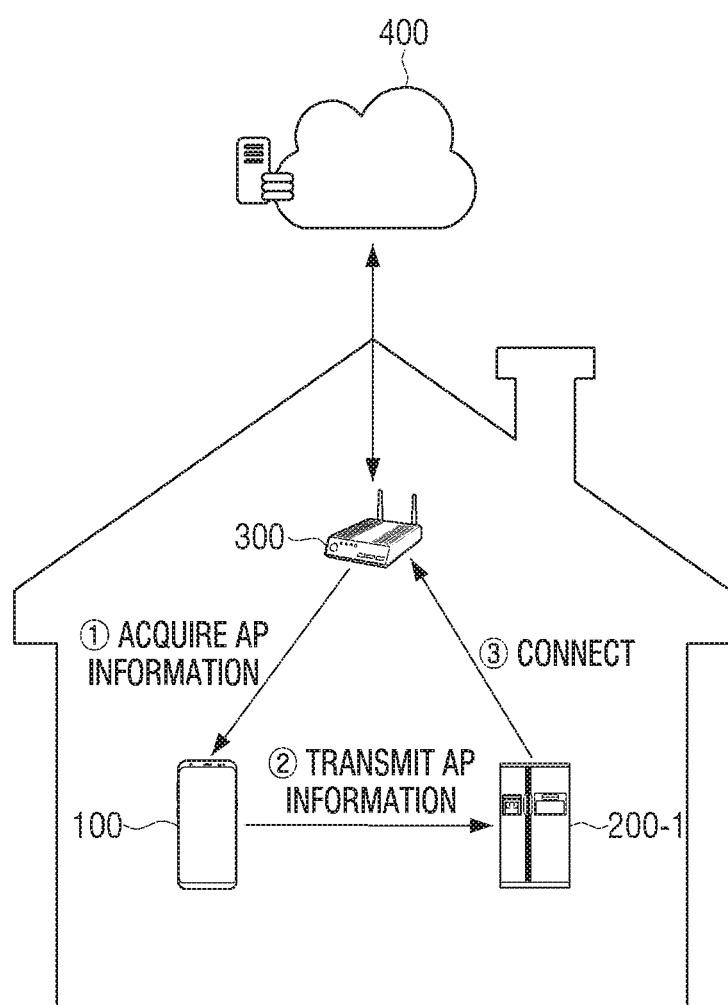
FIG. 1 illustrates a system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this document, the expressions "have," "may have," "including," or "may include" may be used to denote the presence of a feature (e.g., a component, such as a numerical value, a function, an operation, a part, or the like), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of" The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

Terms used in the disclosure may be used only to describe specific embodiments rather than restricting the scope of other embodiments. Terms used in the specification including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even though they are defined in the disclosure.

The electronic devices according to various embodiments may include at least one of, for example, smal (phones, tablet personal computer (PC)s, mobile phones, video telephones, artificial intelligence (AI) speaker, electronic book readers, desktop PCs, laptop PCs, netbook computers, workstations, servers, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device. According to various embodiments of the disclosure, a wearable device may include at least one of the accessory type (e.g., a watch, a ring, a bracelet, a wrinkle bracelet, a necklace, a pair of glasses, a contact lens or a head-mounted-device (HMD)), a fabric or a garment-embedded type (e.g., an electronic clothing), a body-attached type (e.g., a skin pad or a tattoo), a bio-implantable type (e.g., an implantable circuit), and the like.

In some embodiments of the disclosure, the electronic device may be a home appliance. The home appliance may include at least one of, for example, a television, a digital video disc (DVD) player, audio, refrigerator, cleaner, ovens, microwaves, washing machines, air purifiers, set-top boxes, home automation control panels, security control panels, television (TV) box (e.g., Samsung HomeSync™, Apple TV™, or Google TV™), game consoles (e.g., Xbox™, PlayStation™), electronic dictionary, electronic key, camcorder, electronic frame, or Internet of Things (IoT) devices (e.g., light bulbs, various sensors, electricity or gas meters, sprinkler devices, fire alarms, thermostats, street lights, toasters, exercise equipment, hot water tanks, heater, boiler, and the like).

In other embodiment, the electronic device may include at least one of a variety of medical devices (e.g., various portable medical measurement devices, such as a blood glucose meter, a heart rate meter, a blood pressure meter, or a temperature measuring device), magnetic resonance angiography (MRA), magnetic resonance imaging (MRI), computed tomography (CT), capturing device, or ultrasonic wave device, and the like), navigation system, automotive infotainment devices, marine electronic equipment (e.g., marine navigation devices, gyro compasses, and the like), avionics, security devices, car head units, industrial or domestic robots, automatic teller's machine (ATM), or points of sales of stores.

In another embodiment, the electronic device may include at least one of a furniture, a portion of a building/structure, an electronic board, an electronic signature receiving device, a projector, or various metrology instruments (e.g., water, electricity, gas, or radio wave measuring equipment, or the like). The electronic device according to various embodiments may be one or a combination of the aforementioned various devices. The electronic device according to an embodiment may be a flexible electronic device. The electronic device according to an embodiment may include an electronic device that is connected to the external Internet through connection with a network equipment, such as an access point, a gateway, a router, a switch, or the like, and may include a new electronic device in accordance with the technology development.

A first electronic device 100 is a device capable of performing registration, control, management, and the like, for another electronic device. In some cases, the first electronic device 100 may be referred to as a control device, and the other electronic device may be referred to as a controlled device.

When there are a plurality of electronic devices other than the first electronic device 100, terms, such as second and third are used in the second electronic device and the third electronic device, in order to distinguish the electronic devices. Throughout this disclosure, the second electronic device, the third electronic device, and the like, other than the first electronic device 100, are terms used to describe a plurality of different devices in one embodiment. For example, it is only for distinguishing different devices in one embodiment, and the second electronic device and the third electronic device in one embodiment may not necessarily mean the same device as the second electronic device and the third electronic device in another embodiment. For example, a second electronic device 200-1 and a third electronic device 200-2 in the embodiment described with reference to FIG. 2 may not be the same devices as a second electronic device 400-1 and a third electronic device 400-2 of the embodiment of FIG. 4. Similarly, the second electronic device 200-1 and the third electronic device 200-2 in the embodiment described with reference to FIG. 2 may not be the same device as a second electronic device 1200-1 and a third electronic device 1200-2 in the embodiment described with reference to FIG. 12. Meanwhile, in this disclosure, devices other than the first electronic device 100 may be referred to as external device. For example, the second electronic device, the third electronic device, or the like, correspond to the external device relative to the first electronic device 100. Thus, the second electronic device and the third electronic device may be referred to as an external device, a first external device, a second external device, or the like. In other words, the external device or the first external device, the second external device, or the like, may be referred to as a second electronic device, a third electronic device, or the like. Further, the content described with respect to the second electronic device in this disclosure may be applied to a third electronic device, a fourth electronic device, or the like, and the content described with respect to the first external device may be applied to a second external device, a third external device, or the like.

FIG. 1 illustrates a system according to an embodiment of the disclosure.

Referring to FIG. 1, the system may include the first electronic device 100, the second electronic device 200-1, an access point 300, and a server 400.

The second electronic device 200-1 may be an electronic device, such as a TV, an air-conditioner, a refrigerator, a washing machine, a robot cleaner, a humidifier, a door lock, a dish washer, a security camera, a closed circuit television (CCTV), a security sensor, light emitting diode (LED), a lamp, a heating device, a power measuring device, a power socket, an electricity socket, a multi-tap, personal computer (PC), internet protocol (IP) camera, Internet telephone, wired/wireless telephone, electrically-controllable curtain, blind, AI speaker, IoT, or the like, but is not limited thereto. The electronic device may include an electronic device that needs to be connected to the external Internet through connection with the network equipment which requires setting, such as the access point, router, gateway, router, switch, or the like. FIG. 1 illustrates a refrigerator as an example of the second electronic device 200-1.

The second electronic device 200-1 is an electronic device equipped with a communication function and may communicate with an external device using a wireless communication method, such as wireless fidelity (Wi-Fi), Zonal Intercommunication Global-standard, where Battery life is long, which is Economical to deploy, and which exhibits Efficient use of resources (ZigBee), Z-Wave, Bluetooth, or the like, but is not limited thereto. The second electronic device 200-1 may communicate with an external device by a wired communication method. The wired communication may include, for example, universal serial bus (USB), Ethernet communication method, or the like.

The first electronic device 100 may be an electronic device, such as, for example, a smartphone, a tablet PC, a remote controller, a personal computer, a TV, or the like, but is not limited thereto. FIG. 1 illustrates a smartphone as an example of the first electronic device 100.

The first electronic device 100 is an electronic device having a communication function and may communicate with an external device by wireless communication methods, for example, Wi-Fi, ZigBee, Z-Wave, Bluetooth, or the like, but the communication method is not limited thereto. The first electronic device 100 may communicate with an external device through a wired communication method. The wired communication may include, for example, a universal serial bus (USB), an Ethernet communication method, or the like.

The first electronic device 100 is a device capable of performing registration, control, management, or the like, of a second electronic device 200-1. The first electronic device 100 may register the second electronic device 200-1 to a user account of the server 400 and may check and confirm the state of the second electronic device 200-1 anytime anywhere. The first electronic device 100 may be named a control device and the second electronic device 200-1 may be named a controlled device.

The first electronic device 100 may communicate with the second electronic device 200-1 through the server 400 or by using device-to-device (D2D) or peer-to-peer (P2P) connection.

An access point (AP) 300 is a low-power wireless device to serve as a base station in a wireless LAN, and the access point is to act as a bridge connecting the wired communication and wireless communication. The access point from the wired network perspective may be implemented on a router, a switch, or the like, and accordingly, the access point serves to extend the wired network to a wireless network. For example, the access point may be implemented as a wireless network card, an IP router connected to a modem, or the like.

The first electronic device 100 and the second electronic device 200-1 may perform communication with another external device connected to the access point 300 or the server 400 via the access point 300.

The server 400 may be implemented as a cloud server. According to an embodiment, the server 400 may include an account server and a service server. The account server may perform user authentication. The service server may perform functions, such as web portal, device status information management, remote access, device update, message notification, or the like.

The service provided by the system may be divided into device registration and device control largely.

The device registration may mean, for example, allowing the first electronic device 100 to support the new second electronic device 200-1 connecting to the network, and registering the second electronic device 200-1 in an account of a specific user of the server 400. The procedure for supporting access to the network includes a process in which the first electronic device 100 supports the second electronic device 200-1 to connect to the access point 300.

The device control is a process for, for example, controlling the second electronic device 200-1 through the server 400 using the first electronic device 100 after registering the second electronic device 200-1 or controlling the second electronic device 200-1 using the first electronic device 100 without intervention of the server 400.

When the first electronic device 100 and the second electronic device 200-1 are used in a home, they may be referred to as home devices. The first electronic device 100, the second electronic device 200-1, and the server 400 may communicate directly or through a home gateway (not shown). The home gateway may manage and control overall home devices in the home network including the second electronic device 200-1 and the first electronic device 100 in association with the server 400. The home gateway may serve as a bridge between devices using different communication protocols by supporting various communication protocols. For example, a home device may support protocol translation between a ZigBee or Z-Wave based device and a Wi-Fi-based device. It is not limited to being used in a house and there is no restriction in an environment for use.

The first electronic device 100 may provide various services to a user through a smart control application. The smart control application is a program that runs on an operating system (OS) of the first electronic device 100 and may be basically embedded in the first electronic device 100 or may be downloaded from an application store, such as Google Play™ or Samsung Apps™. The first electronic device 100 may perform registration, control, management, and the like, of the second electronic device 200-1 through the smart control application. The term "smart control application" used in the disclosure is merely an example and may be referred to as other names. The smart control application may provide various services through various hardware configurations of the first electronic device 100.

According to the disclosure, the first electronic device 100 may connect another electronic device, such as the second electronic device 200-1 to the access point 300. For example, as shown in FIG. 1, the first electronic device 100 may obtain AP information (e.g., service set identifier (SSID), security type, encryption type, and the like) from the access point 300, and transmit the AP information to the second electronic device 200-1 in order to connect the second electronic device 200-1 to the access point 300. Then, the second electronic device 200-1 may be connected to the access point 300 using the AP information. According to an embodiment of the disclosure, the first electronic device 100 may transmit wired connection information to the second electronic device 200-1. For example, the gateway address, subnet mask, domain name service (DNS) address, IP address assigned to the device, or the like, may be transmitted.

In the related-art, it took a very long time for the first electronic device 100 to connect several other electronic devices to the access point 300, because the first electronic device 100 may be connected to only one other electronic device at a time, and the same operation has to be performed several times. For example, the first electronic device 100 may be connected to the second electronic device 200-1 that operates as a SoftAP, and only one-to-one connection is available for the connection.

In order to overcome the drawback of the related-art, according to the disclosure, when the first electronic device 100 transmits the AP information to the second electronic device 200-1, for example, the second electronic device 200-1 may transmit the AP information to the other electronic device.

Figure 2:
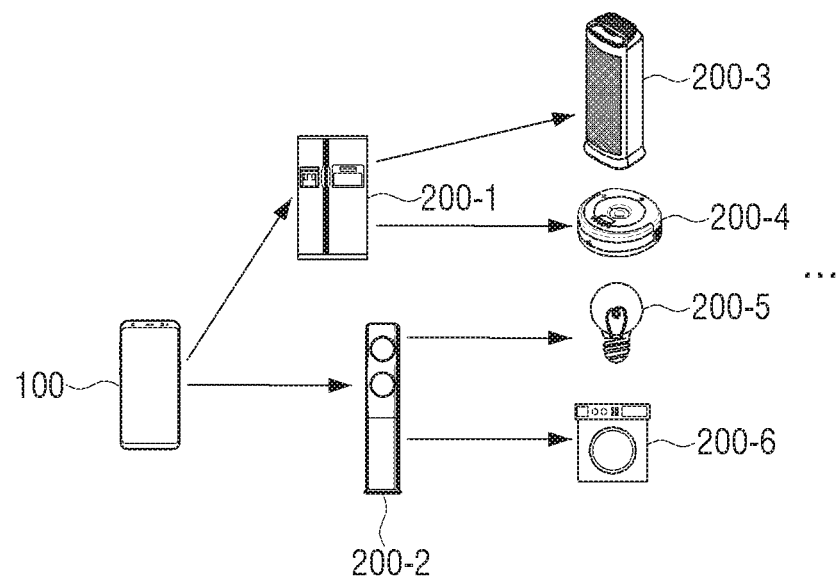
FIG. 2 illustrates an access point (AP) information transmission method according to an embodiment of the disclosure.

FIG. 2 illustrates AP information transmission method according to an embodiment of the disclosure.

Referring to FIG. 2, the first electronic device 100 may transmit the AP information to the second electronic device 200-1. Then, the second electronic device 200-1 may transmit AP information to the fourth and fifth electronic devices 200-3 and 200-4. The first electronic device 100 may transmit the AP information to the second electronic device 200-1 and then disconnect the second electronic device 200-1, and may transmit the AP information to the third electronic device 200-2. Then, the third electronic device 200-2 may transmit the AP information to the sixth and seventh electronic devices 200-5 and 200-6.

As such, it is possible to connect a plurality of electronic devices to the access point at a shorter time. The embodiment of the disclosure has an advantage of reducing the time required for connecting several electronic devices to the access point in cases of, for example, replacing an existing access point due to malfunction, moving to another place, purchasing several electronic devices at a time, or the like.

Figure 3:
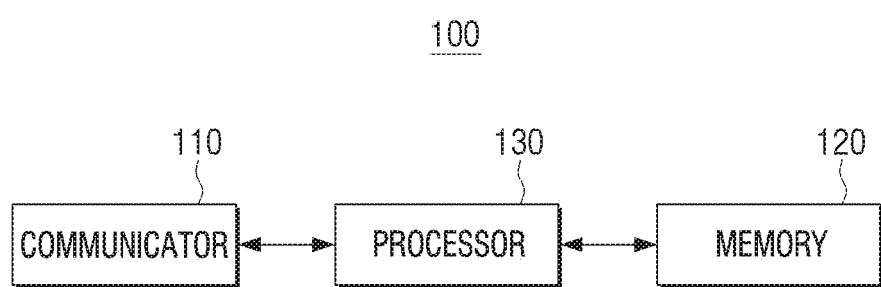
FIG. 3 is a block diagram illustrating a configuration of an electronic device according to an embodiment of the disclosure.

FIG. 3 is a block diagram illustrating a configuration of an electronic device according to an embodiment of the disclosure.

Referring to FIG. 3, the first electronic device 100 may include a communicator 110, a memory 120, and a processor 130. Though not illustrated in some embodiments of the disclosure, the hardware/software configurations in the level obvious to those skilled in the art may be included in the first electronic device 100. For example, the first electronic device 100 may include a display to display an image. The display may be implemented as, for example, a liquid crystal display (LCD). In some cases, the display may be implemented as a cathode-ray tube (CRT), a plasma display panel (PDP), organic light emitting diodes (OLED), transparent OLED (TOLED), or the like. The display may be implemented as a touch screen capable of sensing a touch manipulation of a user. The first electronic device 100 may include a user inputter capable of receiving a user input. The user inputter may be a touch panel, a touch screen, a button (a physical button, a soft button), a motion sensor, a microphone, a remote control signal receiver, or the like.

The communicator 110 is configured to perform communication with various external devices and may be connected to an external device through a wireless communication, such as Wi-Fi, Bluetooth, near field communication (NFC), infrared data association (IrDA), radio frequency identification (RFID), ultra-wideband (UWB), Wi-Fi direct, Z-wave, Zigbee, internet protocol version 4(IPv4) over low-power wireless personal area networks (4LoWPAN), general packet radio service (GPRS), weightless, digital living network alliance (DLNA), ANT+, digital enhanced cordless telecommunications (DECT), wireless local area network (WLAN), global system for mobile communications (GSM), universal mobile telecommunications system (UMTS), wireless broadband (WiBRO), or the like. The communicator 110 may communicate with an external device using wired communication method. The wired communication may include, for example universal serial bus (USB), Ethernet communication method, or the like. The communicator 110 may be implemented as at least one of a communication chip, a transceiver, a communication port, or the like.

The processor 130 is a configuration for controlling the overall operation of the first electronic device 100. For example, the processor 130 may control a plurality of hardware or software components connected to the processor 130 by driving an operating system or an application program, and perform various data processing and operations. The processor 130 may be a central processing unit (CPU), a graphics-processing unit (GPU), or both. For example, the processor 130 may be implemented as at least one of a general processor, a digital signal processor, an application specific integrated circuit (ASIC), a system on chip (SoC), a microcomputer (MICOM), or the like.

The processor 130 may perform at least one instruction executable by computer stored in the memory 120.

The memory 120 may store various data, programs or applications for driving and controlling the first electronic device 100. For example, the memory 120 may store the smart control application. The program stored in the memory 120 may include one or more computer executable instructions. The program (one or more instructions) stored in the memory 120 may be executed by the processor 130.

According to one embodiment, the processor 130 may obtain AP information for connecting to the access point 300. When the first electronic device 100 is initially connected to the access point 300, AP information may be obtained from the access point 300. When the first electronic device 100 has been connected to the access point 300, AP information for connection with the access point 300 is stored in the memory 120. Therefore, the first electronic device 100 may acquire the AP information for connecting to the access point 300 from the memory 120.

The AP information for connecting to the access point 300 may include, for example, the SSID, security type, encryption type, security key, or the like, of the access point 300.

Figure 5:
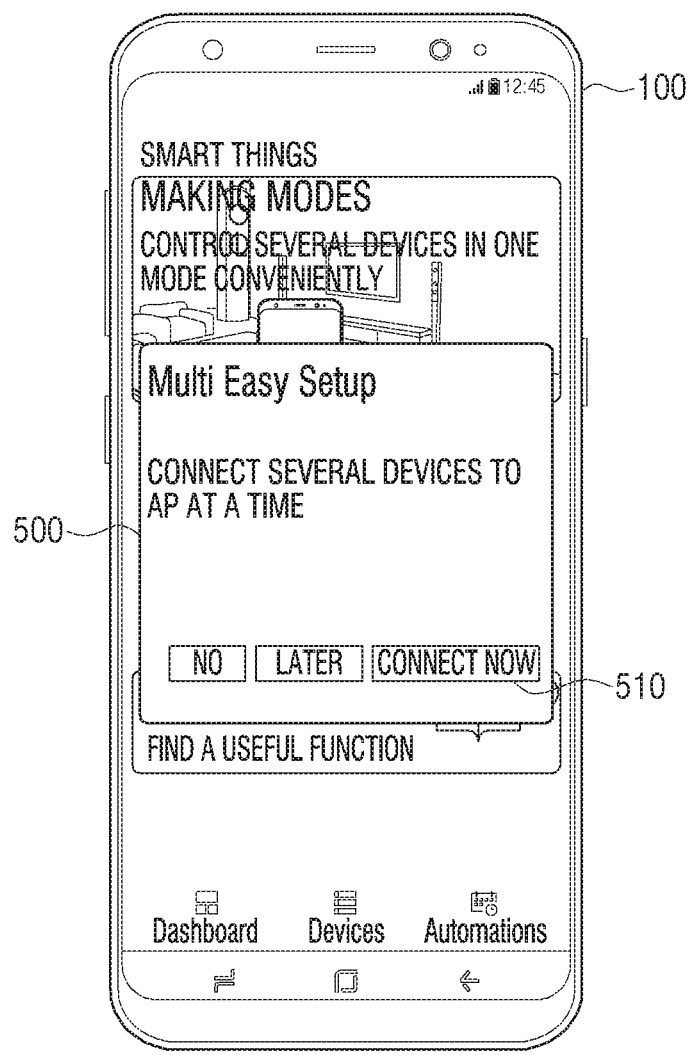
FIGS. 5, 6, 7, 8, 9, and 10 illustrate user interface (UI)s provided by an electronic device according to various embodiments of the disclosure.

FIG. 5 illustrates UIs provided by an electronic device according to an embodiment of the disclosure.

The processor 130 may scan (search) for an external device to connect to the access point. According to an embodiment, the scan of the external device may be performed when a specific user input is received through the user inputter of the first electronic device 100. According to another embodiment, the scan of the external device may be performed when a control command for scanning for an external device is received through the communicator 110. scanning for an external device is a process of detecting the presence of an external device based on a signal transmitted from the external device. According to an embodiment, the smart control application may provide such a scan function. According to one embodiment, the processor 130 may scan the external device to connect to the access point to identify the first electronic device 100 and the second electronic device.

Referring to FIG. 5, when the smart control application is executed on the first electronic device 100, the processor 130 may control the display of the first electronic device 100 to display a UI 500 for asking whether to connect various external devices to the access point. When the user selects a "connect now" UI element 510 through the UI 500, the processor 130 may perform an external device scan.

According to an embodiment, the first electronic device 100 may scan for a second electronic device which operates as SoftAP. The second electronic device, while operating as the SoftAP, may allow connection of the first electronic device 100 as if the general access point.

The second electronic device may not be in the SoftAP state all the time, and may change to the SoftAP in specific circumstances.

According to an embodiment, the user may manually cause the second electronic device to operate as the SoftAP. For example, when a specific button provided in the second electronic device is pressed, the second electronic device 200-1 may operate as the SoftAP.

According to an embodiment of the disclosure, when the power is connected to the second electronic device, but the second electronic device is not connected to network for a predetermined time, the second electronic device may automatically operate as the SoftAP.

According to an embodiment of the disclosure, when power is initially connected (for example, the user initially connects the second electronic device to power after purchasing), the second electronic device may automatically operate as the SoftAP.

According to an embodiment of the disclosure, the second electronic device may automatically operate as the SoftAP, when the certain number of devices are not connected to the network after exchanging information with peripheral devices through other communication means.

According to an embodiment of the disclosure, the first electronic device 100 may cause the second electronic device to operate as the SoftAP. For example, the first electronic device 100 may transmit a signal (IR signal, ultrasonic soundwave signal, or the like) for executing the SoftAP function to the second electronic device.

According to an embodiment of the disclosure, the second electronic device, after receiving information notifying beginning of a specific mode from the first electronic device 100, may automatically operate as the SoftAP when the power is connected, but network is not connected. This will be further described through FIG. 12.

Figure 12:
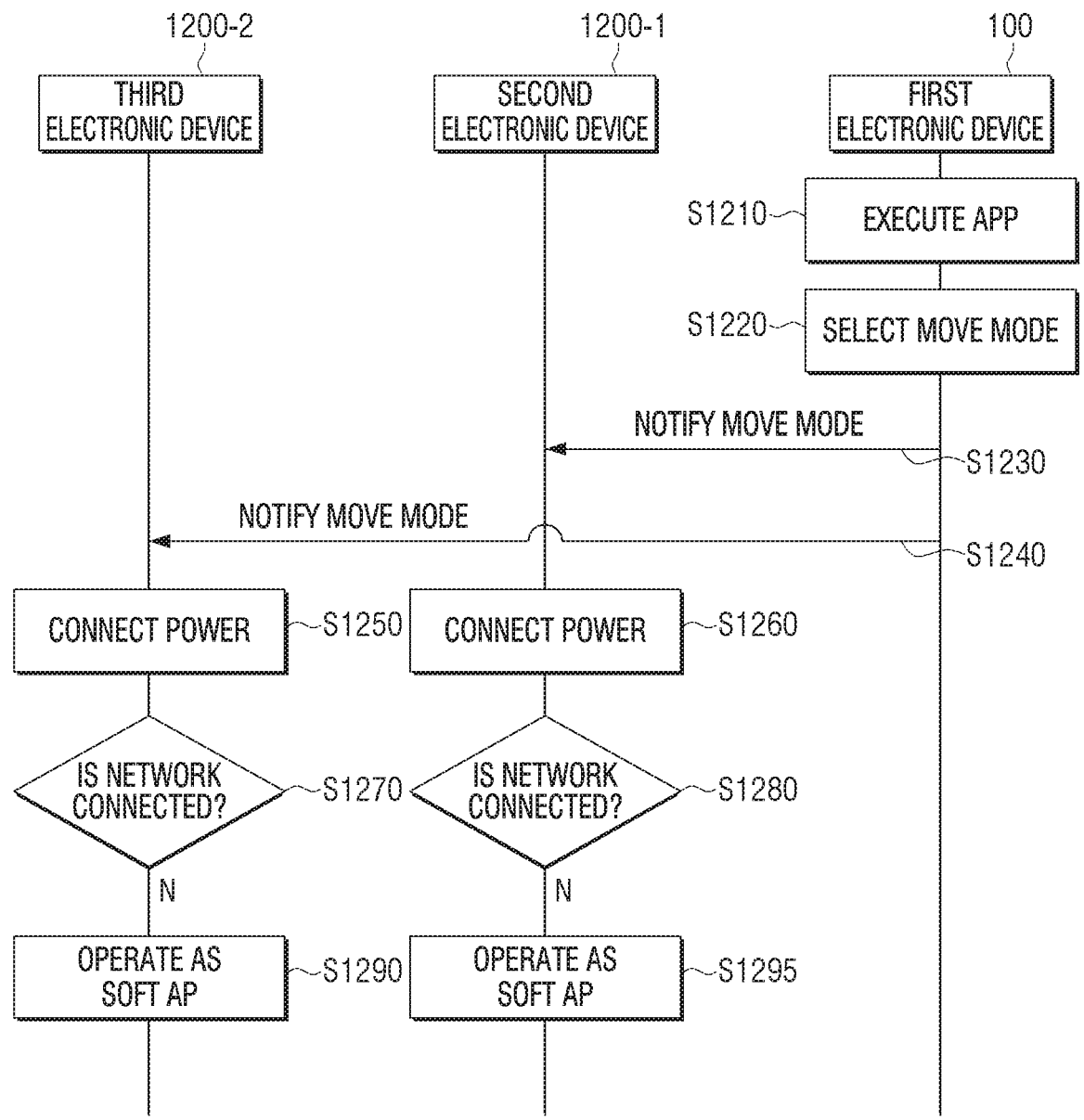
FIG. 12 illustrates a mode provided by an electronic device according to an embodiment of the disclosure.

FIG. 12 illustrates a method of changing external devices to a SoftAP according to an embodiment of the disclosure.

Referring to FIG. 12, the first electronic device 100 executes a smart control application in operation S1210.

The smart control application is executed, and the first electronic device 100 may log in to the server 400 using login information, such as a user identification (ID), a password or biometric information (e.g., fingerprint, iris, voice, and the like). According to an embodiment, the user may be required to input a user ID and password every time to log in to the server 400. According to another embodiment, login may be automatically performed when the smart control application is executed.

The first electronic device 100 may display a UI for selecting a move mode. The move mode is a mode in which registered devices automatically operate as SoftAPs by sharing this situation, such as a case of move, with registered devices when all registered devices need to be connected to a new access point. It is called the move mode by limiting a specific circumstance, but may be named differently. For example, it may be named an AP replacement mode.

Specifically, if the move mode is selected through the UI provided in the first electronic device 100 in operation S1220, the first electronic device 100 may transmit information indicating the move mode to the registered devices. In the case where the registered devices are a second electronic device 1200-1 and a third electronic device 1200-2, the first electronic device 100 may transmit information notifying the move mode to the second electronic device 1200-1 in operation S1230, and transmit the information notifying the move mode to the third electronic device 1200-2 in operation S1240. In this case, the first electronic device 100 may transmit information notifying the move mode directly to the registered devices or through the access point 300, or the server 400.

The second electronic device 1200-1 and the third electronic device 1200-2 which receive the information notifying the move mode may automatically operate as the SoftAP in operation S1290 and S1295, if network scan (search) is not available in operations S1270 and S1280 after power is connected in operation S1250 and S1260.

Not only the SoftAP method but also Bluetooth method may be used.

The processor 130 may identify, among the scanned (searched) external devices, a device to transmit AP information for connecting to the access point 300. When the AP information is transmitted to all of the identified (searched) external devices, the security problem may occur. For example, AP information of my house may be leaked to a device of a neighboring house involuntarily, and thus, AP information is allowed to be transmitted to the selected devices only.

According to an embodiment, the processor 130 may identify devices, among the scanned (searched) external devices, belonging to devices previously registered in an account of a currently logged-in user, as a device to which AP information is transmitted. The login may be performed, for example, by the user inputting an ID, password, or the like through a UI provided by the smart control application. Alternatively, the login may be automatically performed when the smart control application is executed. Information about devices previously registered in an account of the currently logged-in user may have been stored in the memory 120 of the first electronic device 100, or may be received by the processor 130 may request through request to the server 400.

According to an embodiment of the disclosure, the processor 130 may identify the external devices requiring an initial set-up as a device for transmitting AP information. Whether the initial set-up is necessary may be confirmed by a naming policy of the SoftAP.

The above embodiments are to identify a device to which the AP information is transmitted, and as another method, a device to which the AP information is transmitted may be identified by a manual selection of the user.

Figure 6:
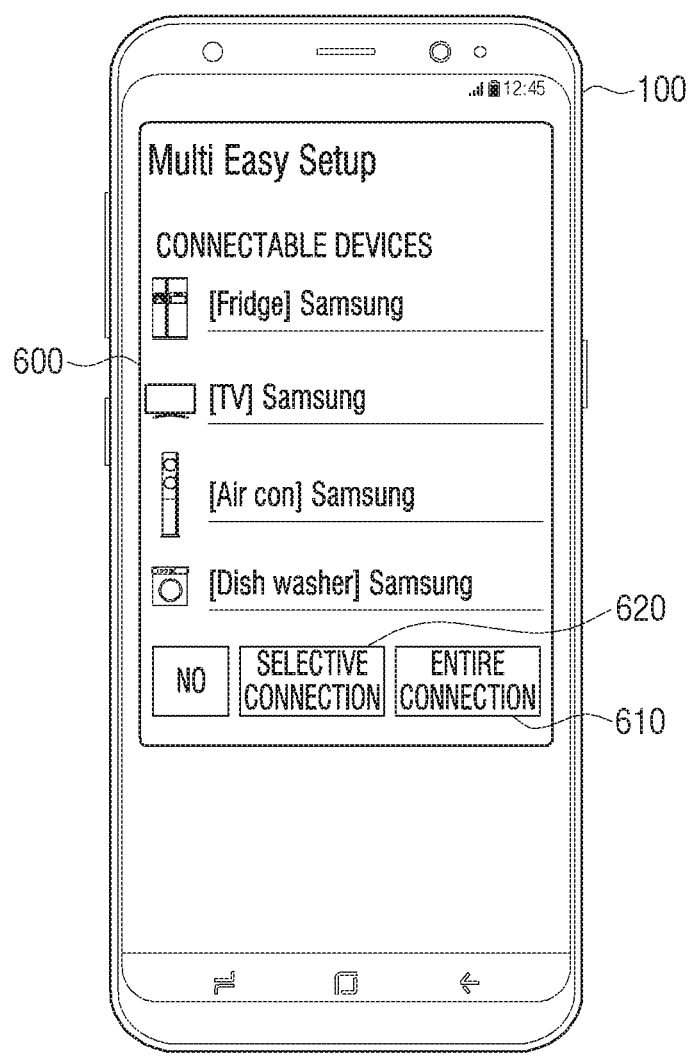

FIG. 6 illustrates UIs provided by an electronic device according to an embodiment of the disclosure.

According to an embodiment, the processor 130 may control the display of the first electronic device 100 to display a UI including a list of identified (searched) external devices for scanning. The user may select a device to be connected to the access point 300 among the UIs. The processor 130 may identify devices selected by the user as a device to transmit AP information about the access point 300 through the UI. FIG. 6 illustrates an example of the UI.

Referring to FIG. 6, the first electronic device 100 may provide a UI 600 including a list of the identified external devices for scanning.

At least one device may be selected through a UI 600. For example, referring to FIG. 6, when the "entire connection" UI element 610 is selected, a connection operation may be performed on all of the devices displayed in the list. In other words, according to the embodiment, it is possible to select several devices at a time, although the related-art devices had to be selected and repeated one by one. Meanwhile, the embodiment is not limited to connecting only all of the devices displayed in the list. For example, when the "selective connection" UI element 620 is selected, one or more devices desired by a user only can be selected.

Figure 7:
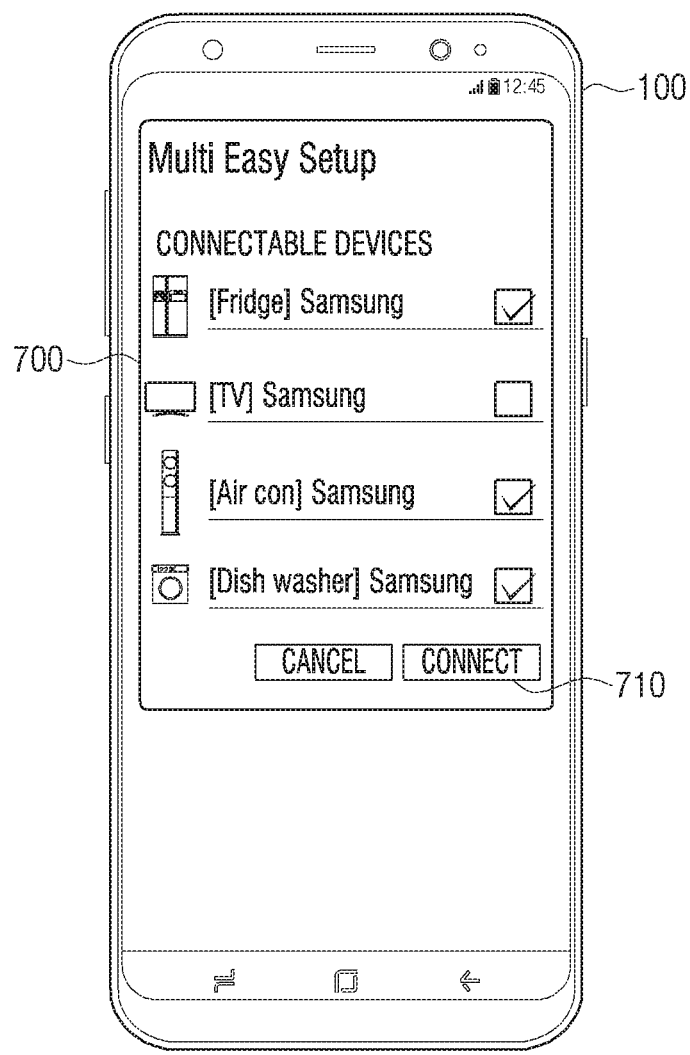

FIG. 7 illustrates a UI that may be provided by a first electronic device according to an embodiment of the disclosure.

Referring to FIG. 7, the first electronic device 100 may provide a UI 700 including a list for identified external devices for scanning.

The user may select the devices to be connected to the access point 300 through the UI 700. For example, when a user selects a box, a check mark is displayed and a device is selected, and when a check-marked box is selected again, the check mark disappears, and selection can be released.

After completing the device selection, when a user selects "connection" UI element 710, the processor 130 may identify the devices selected through the UI 700 as the devices to which the AP information will be transmitted.

The processor 130 may control the communicator 110 to transmit the AP information and the control information to cause the second electronic device to transmit the AP information to another external device to at least one external device, for example, the second electronic device, among the devices identified as a device for transmitting the AP information.

The control information may include a criterion for causing the second electronic device to determine to which device the AP information needs to be transmitted. The criterion may include, for example, an instruction for the second electronic device to transmit AP information to a specific device, for example, a third electronic device, or an instruction to cause the second electronic device to transmit AP information to a device close to the second electronic device, instead of an instruction to transmit the AP information to the specific device.

The processor 130 may set a transmission path of the AP information among a plurality of external devices that are identified as a device to which the AP information will be transmitted, in order to generate the control information.

According to an embodiment, the processor 130 may acquire information of a plurality of external devices based on a signal received from each of the plurality of external devices that are identified as a device to which the AP information will be transmitted, and set a transmission path based on the acquired information.

The processor 130 may acquire information on the distance between the first electronic device 100 and the external devices based on a formula that defines a relation between received signal strength indicator (RSSI) received from the external devices and the distance.

The processor 130 may also detect the direction of the external devices based on the signals received from the external devices. The direction detection method includes an active direction detection method and a passive direction detection method. The active direction detection method is a method of finding a direction by receiving a signal reflected from external devices after the first electronic device 100 emits radio waves and the passive direction detection method is a method in which the first electronic device 100 receives a signal emitted by external devices to find a direction. According to an embodiment, the first electronic device 100 may include two parallel antennas and may use an amplitude comparison direction detection method for comparing amplitude magnitudes of signals reaching two parallel antennas, a phase difference direction detection method for comparing the phases reaching two parallel antennas, or the time difference direction detection method using the time difference when the signals arrive at two array antennas.

The processor 130 may acquire information on a position of external devices by acquiring information on a distance from the first electronic device 100 to the external devices and information on a disposition direction of the external devices, based on a signal received from the external devices.

The processor 130 may set an optimal transmission path for transmitting AP information with the shortest time and/or highest efficiency based on the information on a position. The processor 130 may set a transmission path, for example, in such a manner where the AP information is transmitted from the closest device to the farthest device, or the AP information is transmitted between adjacent devices.

According to another embodiment, the processor 130 may obtain information about a space to which each of the plurality of external devices identified as a device to transmit AP information belongs, and set a transmission path based on the obtained information. For example, in the case of an access point failure and a new replacement of the access point, the devices will be located at the existing location as it is, and thus the information on the existing disposition may be utilized. Information about the disposition spaces of the plurality of registered devices may be stored in the memory 120 or the server 400 of the first electronic device 100. When the information is stored in the server 400, the processor 130 may request the server 400 to provide information about a space to which each of the plurality of external devices belongs. The information about the space may be, for example, information indicating that the second electronic device and the third electronic device are devices of a kitchen, and the fourth electronic device and the fifth electronic device are devices of a living room.

The processor 130 may set an optimal transmission path based on the information on a space to which each of a plurality of external devices belongs. The processor 130 may set a transmission path so as to transfer AP information among the devices in the same room.

The processor 130 may set an optimal transmission path by considering all the acquired distance information, direction information, information prestored in the memory 120 or information on a disposition space acquired from the server 400 based on the received signal.

In the case of the external device which is located at a far distance and a signal is not received, and thus, distance may not be determined, the processor 130 may include the external device in the transmission path based on the information on the disposition space acquired from the server 400.

The first electronic device 100 may also set the transmission path by confirming only the number of external devices to which the AP information is to be simply transmitted, without considering the distance and the position.

When the transmission path has been established, the processor 130 may identify a second external device to which the first external device will transmit the AP information, based on the established transmission path, and control the communicator 110 to transmit, to the first external device, the control information indicating transfer of the AP information to the second external device and the AP information. If the control information includes instructions for transmitting the AP information to the plurality of external devices, the device that receives the control information may transmit AP information while being sequentially connected to the plurality of devices.

If the first external device for transmitting the AP information and the control information are identified based on the transmission path, but the first external device is not scanned (searched), the processor 130 may transmit the AP information and the control information to the second external device that is a next order of the first external device in the transmission path.

Figure 11:
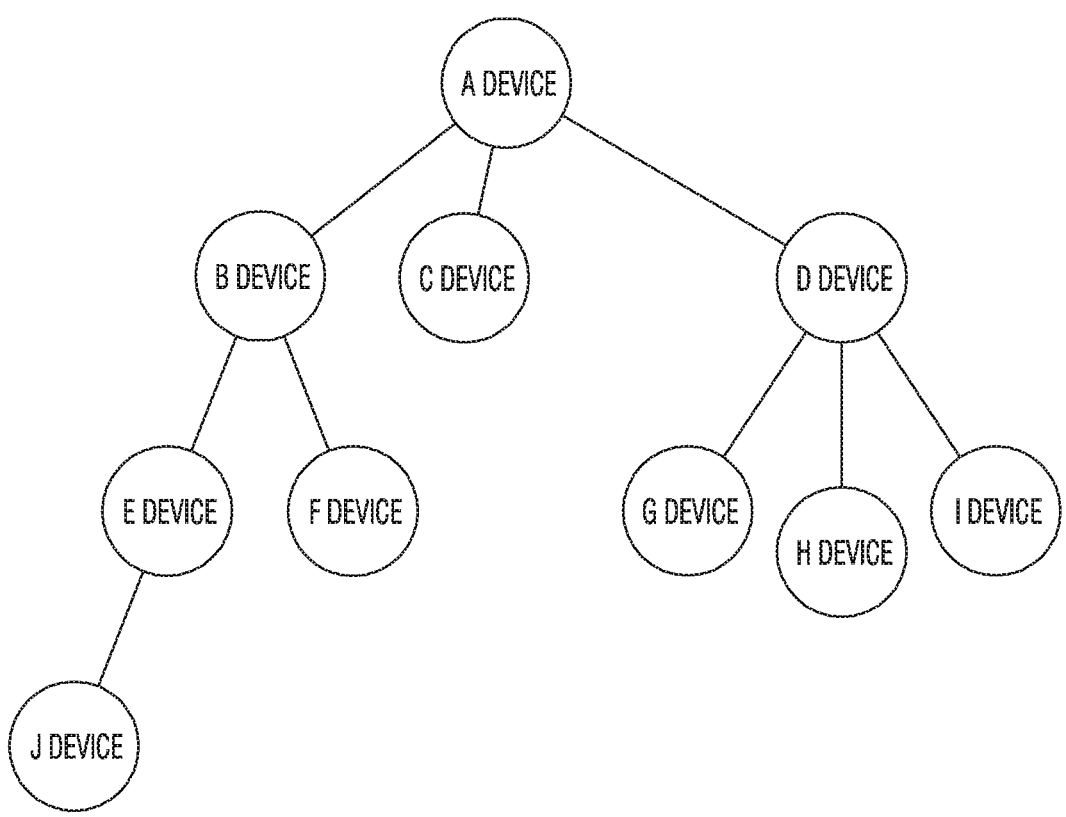
FIG. 11 illustrates a transmission path of transmitting AP information with a tree structure according to an embodiment of the disclosure.

FIG. 11 illustrates a transmission path of transmitting AP information that is set by a first electronic device according to an embodiment of the disclosure. The transmission path may have a tree structure as illustrated in FIG. 11. Based on the transmission path of the tree structure, the first electronic device 100 may identify the external devices in a lower layer of the external device that transmits the AP information, and generate the control information instructing to transmit the AP information to the identified external devices.

Referring to FIG. 11, when device A is the first electronic device 100, the first electronic device 100 may transmit AP information to the device D, which operates with the SoftAP, based on a transmission path of a tree structure, and may transmit the control information for instructing the device D to transmit the AP information to the G device, the H device, and the I device as well. The device D which received the control information may, after being converted to a station mode, transmit the AP information to the G device operating as the SoftAP, transmit the AP information to the H device using the same method, and transmit the AP information to the I device. The first electronic device 100, which is device A, may transmit AP information, to the B device, AP information and control information for instructing device B to transmit AP information to device E and device F.

As such, the first device (A device) may transmit control information to cause the second device (D device) to transmit AP information to the third device (G, H, and I devices), and information that the first device controls the third device, the fourth device. . . . For example, when device A is the first electronic device 100, the first electronic device 100 may transmit, to the B device, not only first control information to transmit the AP information to the E device and F device, but also the second control information to instruct the E device to transfer AP information to the J device. Then, the device B may transmit the second control information and the AP information to the E device, and the E device may transmit the AP information to the J device according to the second control information. As such, the AP information may be transmitted in a tree structure.

According to an embodiment of the disclosure, even if the initial device does not transmit the control information giving a specific instruction to each device, it is possible to transmit only information on a transfer path, and the devices receiving the same may transmit the AP information to a next device voluntarily.

For example, the control information transmitted by the first electronic device 100 may include information on the transfer path of the AP information. In this case, the second electronic device which received the control information may identify a device which is next to the second electronic device by itself, and transmit the AP information to the next device based on the identified result.

For example, referring to FIG. 11, it may be identified that the A device may transmit information on the transmission path and the AP information to the B device, and the B device may transfer the AP information to the E device and F device based on the transmission path. It may be identified that the B device transfers the AP information to the E device again along with the information on the transmission path received from the A device, and E device may have to transmit AP information to J device based on the information on the transmission path.

Figure 8:
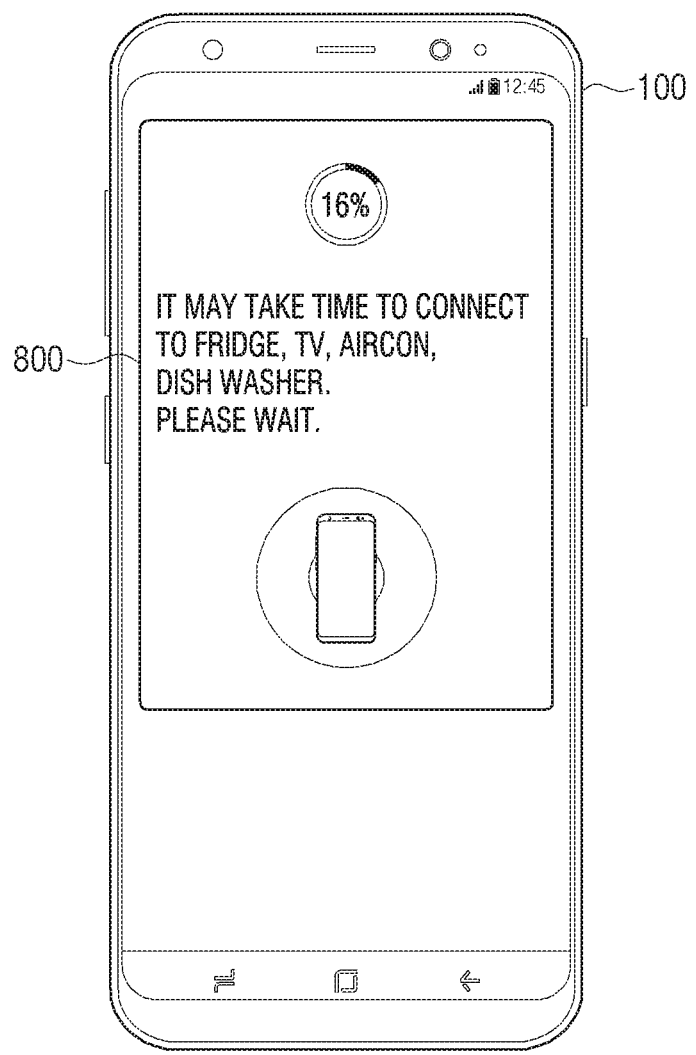

FIG. 8 illustrates a UI that may be provided while a first electronic device is waiting for information indicating connection to an access point from external devices that are identified as devices to which AP information is to be transmitted according to an embodiment of the disclosure.

Referring to FIG. 8, the first electronic device 100 may wait until receiving information from all the external devices identified as the device to which AP information is to be transmitted, and provide a UI 800 notifying the same during waiting. The UI 800 may include information indicating which device is being connected. For example, the first electronic device 100 may provide the UI 800 notifying that the network connection for the second electronic device and the third electronic device is being in progress.

According to an embodiment of the disclosure, the first electronic device 100 may, when receiving information indicating that each of the external devices identified as a device to be transmitted with AP information are connected to the access point 300, display information indicating that the device is connected to the access point 300. For example, upon receiving information indicating connection completion from the second electronic device, the information indicating that the second electronic device is connected may be displayed, and then, when the information indicating connection completion is received from the third electronic device, the information indicating that the third electronic device is connected may be sequentially displayed.

The first electronic device 100 may receive information confirming that the second electronic device is connected to the access point 300 from the second electronic device, or the server 400.

The processor 130, when the preset information is received from the external devices through the access point 300 after transmitting the AP information and the control information, may confirm that the devices are connected to the access point 300.

The processor 130 may confirm, on a real-time basis, regarding which device has been connected to the access point 300 and which device has not yet been connected to the access point 300, among the external devices which are identified as devices to which AP information is to be transmitted, and control the communicator 110 to transmit the AP information to a device which has not yet been connected to the access point 300. The same operation may be repeated until all the devices are connected to the access point 300.

The processor 130, when confirming that all the external devices that are identified as the device to which AP information is to be transmitted are connected to the access point 300, may control the display of the first electronic device 100.

Figure 9:
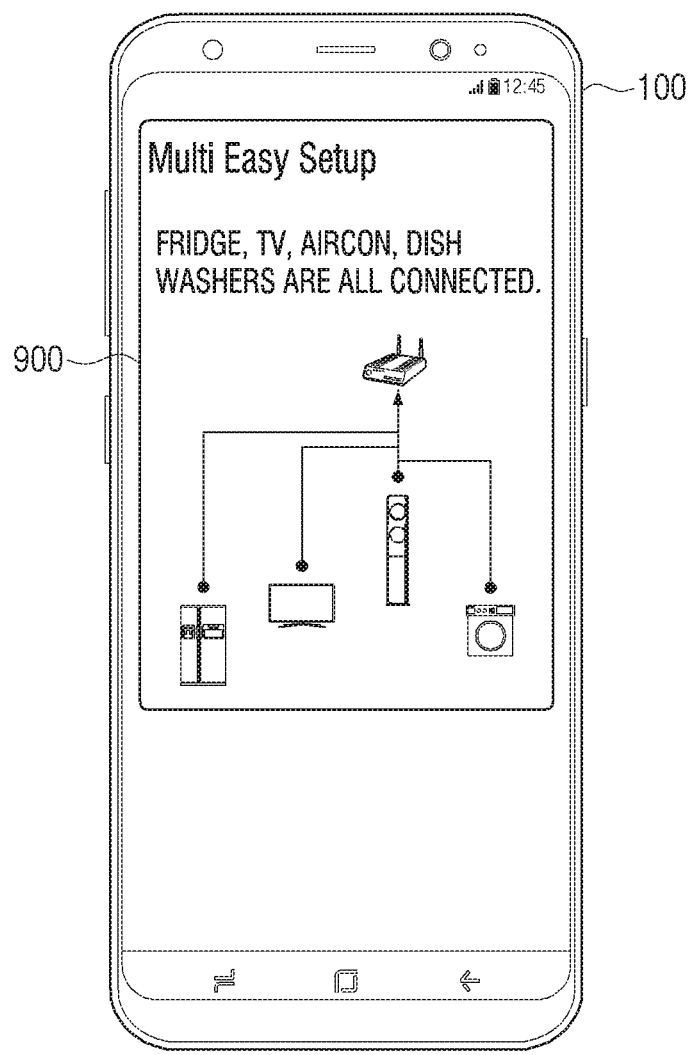

FIG. 9 illustrates UIs provided by an electronic device according to an embodiment of the disclosure.

Referring to FIG. 9, a UI 900 indicating connection completion may be provided.

Meanwhile, when the external device connected to the access point 300 is an unregistered device, the first electronic device 100 may also perform a registration process for the unregistered device. For example, when the second electronic device and the third electronic device are connected to the access point 300 and these devices are unregistered devices, the processor 130 may transmit the pre-stored server connection information to the second electronic device and the third electronic device through the access point 300. The server connection information may include, for example, an authentication code and an address of a server. The devices that receive the server connection information may request registration with the server 400 using the information. Meanwhile, the server connection information may be transmitted together when the first electronic device 100 transmits AP information and control information to the second electronic device.

The first electronic device 100 may control the registered devices.

Figure 10:
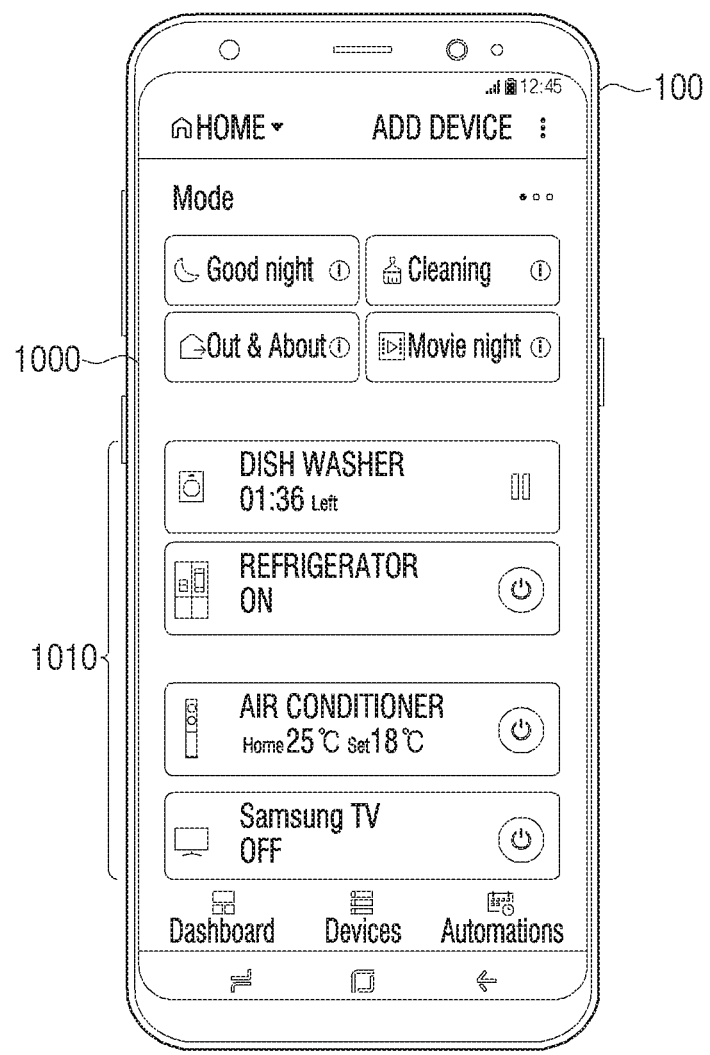

FIG. 10 illustrates UIs provided by an electronic device according to an embodiment of the disclosure.

Referring to FIG. 10, a UI 1000 including UI elements 1010 corresponding to each of registered devices may be provided in the first electronic device 100. The user may control the corresponding device by selecting a menu provided by the UI elements 1010, such as a power on or a power off menu.

Figure 4:
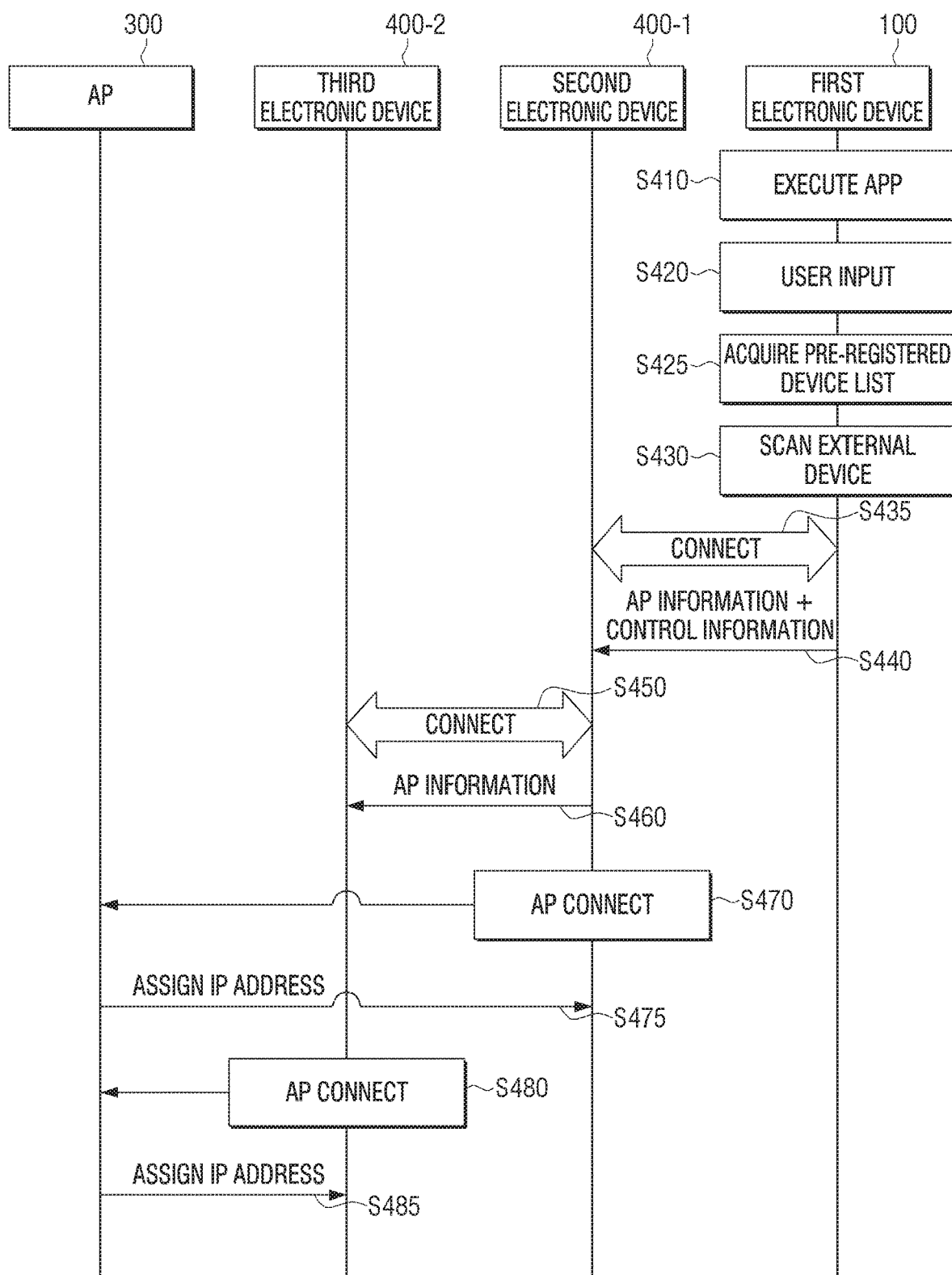
FIG. 4 illustrates a flowchart of a system operation method according to an embodiment of the disclosure.

FIG. 4 illustrates a flow of a system of connecting several electronic devices to an access point according to an embodiment of the disclosure.

Referring to FIG. 4, the user executes the smart control application in the first electronic device 100 in operation 5410.

The smart control application is executed, and the first electronic device 100 may log in to the server 400 using login information, such as a user ID and a password or biometric information (e.g., fingerprint, iris, voice,). According to an embodiment, in order to log in to the server 400, the user may be required to input a user ID and password every time. According to an embodiment of the disclosure, login may be automatically performed when the smart control application is executed.

The first electronic device 100 may receive a user input for connecting an external device to the access point 300 in operation 5420. For example, the first electronic device 100 may provide a UI 500 as shown in FIG. 5, and when the user selects the "connect now" UI element, the first electronic device 100 may start an operation for connecting the external device to the access point 300.

The first electronic device 100 may obtain a list of devices pre-registered in the account of the logged-in user in operation 5425. The list of registered devices may be stored in the first electronic device 100 or the first electronic device 100 may receive the list from the server 400. It is assumed and described that the second electronic device 400-1 and the third electronic device 400-2 are included in the list of pre-registered devices.

The first electronic device 100 may scan for an external device in operation 5430. The meaning of scanning (searching) for an external device may mean recognizing the existence of the external device.

The second electronic device 400-1 and the third electronic device 400-2 are devices outside the first electronic device 100 and may be referred to as an external device. The operation of the second electronic device 400-1 which will be described below may be performed in the same manner by the third electronic device 400-2.

For example, the second electronic device 400-1 may transmit a signal using wireless communication method, such as Bluetooth, Zigbee, Z-wave, or the like, and the first electronic device 10 which receives the signal may recognize the existence of the second electronic device 400-1 and the third electronic device 400-2.

As an example, the second electronic device 400-1 may be operating as the SoftAP, and the first electronic device 100 may recognize the existence of the second electronic device 400-1 which operates with the SoftAP.

The second electronic device 400-1 may operate as the SoftAP and periodically transmit a beacon. The beacon is a signal for the second electronic device 400-1 to inform its surroundings so that the peripheral device can sense itself and participate in mutual communication. The beacon may include a Service Set Identifier (SSID), a beacon interval, capability information, or the like, of the second electronic device 400-1, and may be expressed in a diverse manner using the vendor specific field.

The SoftAP function may be executed manually or automatically. According to an embodiment, the user may operate the second electronic device 400-1 with the SoftAP. For example, a specific button provided in the second electronic deice 400-1 is pressed, the second electronic device 400-1 may operate as the SoftAP.

According to an embodiment of the disclosure, the second electronic device 400-1 may automatically operate as the SoftAP when power is connected and connection to the network is not performed for a preset time.

According to an embodiment of the disclosure, the second electronic device 400-1 may automatically operate as the SoftAP when a predetermined number of devices are not connected to the network, after exchanging information with peripheral devices through another communication means.

According to an embodiment of the disclosure, it is possible for the first electronic device 100 to operate the second electronic device 400-1 and the third electronic device 400-2 as the SoftAP. For example, the first electronic device 100 may transmit a signal (IR signal, ultrasonic signal, or the like) for executing the SoftAP function to the second electronic device 400-1 and the third electronic device 40-2.

According to an embodiment of the disclosure, after receiving information notifying beginning of a specific mode from the first electronic device 100, the second electronic device 400-1 may automatically operate as the SoftAP when power is connected and then network connection is not performed.

According to an embodiment of the disclosure, the SSID included in the beacon transmitted by the second electronic device 400-1 may include a character string that enables to recognize which device the second electronic device 400-1 is, or may be assigned uniquely each device or to devices of the same model. The SSID may be dynamically assigned if necessary, or may be assigned using a certain rule through an application. When the second electronic device 400-1 is a smart home device, for example, the SSID may be generated based on a smart home protocol (SHP), an indicator indicating that the device is a smart home device, a type, a production date, a version, and the like of the device. For example, if the second electronic device 400-1 is a TV that supports the smart home function and is produced in 2018, the SSID of the second electronic device 400-1 may be as follows "SHP.TV.2018."

The first electronic device 100 may identify a device to which AP information is to be transmitted, among the scanned (searched) external devices, and perform an operation to connect the identified device to the access point 300.

When the first electronic device 100 identifies the SSID received from the second electronic device 400-1 and the third electronic device 400-2, for example, and the second electronic device 400-1 and the third electronic device 400-2 are identified as devices belonging to the list of the registered device, the first electronic device 100 may perform an operation of connecting the second electronic device 400-1 and the third electronic device 400-2 to the access point 300. Alternatively, the first electronic device 100 may provide a UI including a list of identified (searched) devices for scanning as illustrated in FIGS. 6 to 7, and identify a device selected from the UI as a device to transmit AP information.

The first electronic device 100 performs communication connection with any device, for example, the second electronic device 400-1 among the devices that are identified as devices to which AP information is to be transmitted in operation 5435.

According to the embodiment using the SoftAP function, since the second electronic device 400-1 is operating as a SoftAP, the second electronic device 400-1 may allow access of the first electronic device 100 as if the AP. According to an embodiment, the first electronic device 100 may support a function of automatically accessing the SoftAP. According to another embodiment, the function of automatically accessing the SoftAP may not be supported, and in this case, the user must manually select a device operating as the SoftAP from a list of devices displayed on the first electronic device 100, for example.

According to an embodiment, connection may be completed only after the first electronic device 100 transmits a connection request to the second electronic device 400-1 that operates as the SoftAP, and there is a separate user manipulation for approval of the access by the second electronic device 400-1. For example, when the first electronic device 100 transmits a connection request to the second electronic device 200-1 operating as a SoftAP, the second electronic device 200-1 may output a text or an image through the display of the second electronic device 200-1 to inform the user of the second electronic device 200-1, turn on LED provided in the second electronic device 200-1, or output sound through the speaker of the second electronic device 200-1. When the user presses a button for access approval in the second electronic device 200-1, the first electronic device 100 and the second electronic device 200-1 may be connected.

In addition to the SoftAP method, using various communication methods, such as Wi-Fi P2P method, Bluetooth low energy (BLE), Bluetooth, ZigBee, radio frequency (RF) communication, Z-wave, or the like, the second electronic device 400-1 and the first electronic device 100 may be connected.

When the second electronic device 400-1 and the first electronic device 100 are connected for communication, the first electronic device 100 may transmit, to the second electronic device 400-1, the AP information for connecting to the access point 300, and control information for causing the second electronic device 400-1 to transmit the AP information to the third electronic device 400-2 in operation 5440.

Since the first electronic device 100 has been connected to the access point 300, the first electronic device 100 stores the AP information for the access point 300. Accordingly, the first electronic device 100 can provide the prestored AP information to the second electronic device 400-1. The AP information for the AP may be, for example, the SSID of the access point 300, securityType, encryptionType, securityKey, or the like.

Thereafter, though not illustrated, the first electronic device 100 may disconnect with the second electronic device 400-1 and may be connected to the access point 300.

The second electronic device 400-1 may connect communication with the third electronic device 400-2 according to the control information received from the first electronic device 100 in operation 5450.

According to an embodiment of using the SoftAP function, as the third electronic device 400-2 is operating as the SoftAP, the third electronic device 400-2 may allow access of the second electronic device 400-1 as if it is the AP. The second electronic device 400-1 may support a function to automatically connect the SoftAP.

In addition to the SoftAP method, the second electronic device 400-1 and the third electronic device 400-2 may be connected through various communication methods, such as Wi-Fi P2P method, bluetooth low energy (BLE), Bluetooth, ZigBee, radio frequency (RF) communication, Z-wave, or the like.

When the second electronic device 400-1 and the third electronic device 400-2 are connected for communication, the second electronic device 400-1 may transmit the AP information for the access point 300 provided from the first electronic device 100 to the third electronic device 400-2 in operation 5460.

Though not illustrated, the second electronic device 400-1 may stop connection with the third electronic device 400-2. The second electronic device 400-1 may access the access point 300 using the AP information provided by the first electronic device 100 in operation 5470.

The second electronic device 400-1 may be assigned with the IP address from the access point 300 in operation 5475. Thereby, the second electronic device 400-1 may communicate with the external device, such as the server 400 through the access point 300.

The third electronic device 400-2 may access the access point 300 using AP information provided by the second electronic device 400-1 in operation 5480. The third electronic device 400-2 may be assigned with an IP address from the access point 300 in operation 5485. As a result, the third electronic device 400-2 may communicate with an external device, such as the server 400 through the access point 300.

When the second electronic device 400-1 and the third electronic device 400-2 are connected to the access point 300, the information notifying the connection may be transmitted to the first electronic device 100, and when the second electronic device 400-1 and the third electronic device 400-2 are unregistered devices, the first electronic device 100 may log in to the server 400 (if it is already logged in, log in process may be omitted), and may transmit a request for registration request to register the second electronic device 400-1 and the third electronic device 400-2 to the server 400 through the access point 300.

The registration request that is transmitted this time may include identification information of the second electronic device 400-1 and the third electronic device 400-2.

In addition, the second electronic device 400-1 and the third electronic device 400-2 may transmit a registration request to the server 400 through the access point 300 using the server connection information. The registration request transmitted by the second electronic device 400-1 to the server 400 may include identification information of the second electronic device 400-1, and the registration request transmitted by the third electronic device 400-2 to the server 400 may include identification information of the third electronic device 400-2.

Thereafter, the server 400 may register the second electronic device 400-1 and the third electronic device 400-2 to the user account only in a case where the identification information of the second electronic device 400-1 and the third electronic device 400-2 included in the registration request received from the first electronic device 100 and the identification information included in the registration request received from each of the second electronic device 400-1 and the third electronic device 400-2 are the same from each other.

Figure 13:
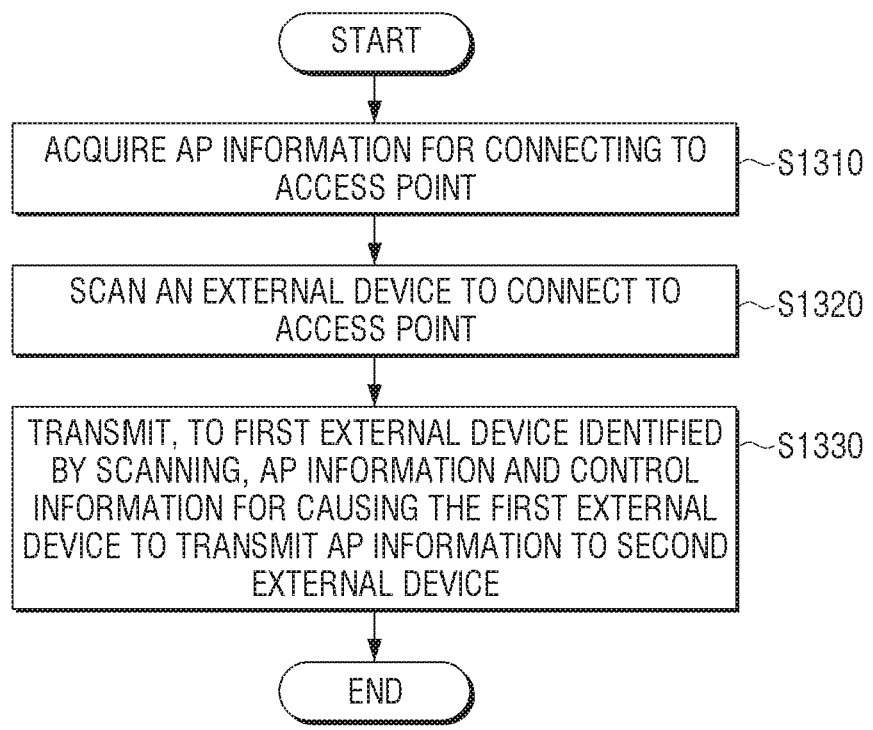
FIG. 13 is a flowchart illustrating a method for controlling an electronic device according to an embodiment of the disclosure.

FIG. 13 illustrates a method for controlling an electronic device according to an embodiment of the disclosure. The flowchart illustrated in FIG. 13 may include the operations processed by the first electronic device 100 that is described in this disclosure. Therefore, even if omitted hereinbelow, the content described with reference to the first electronic device 100 may be applied to the flowchart illustrated in FIG. 13 as well.

Referring to FIG. 13, the electronic device may acquire the AP information for connection to the access point 300 in operation S1310.

The electronic device may scan (search) for an external device for connecting to the access point in operation S1320. According to an embodiment, the scan (search) of an external device may be performed when a specific user input is received through the user inputter of the electronic device.

The electronic device may transmit, to the identified (searched) first external device, AP information and the control information to cause the first external device to transmit the AP information to the second external device in operation S1330.

According to an embodiment, the electronic device may set a transmission path for transmitting the AP information to a plurality of external devices including the identified (searched) first and second external devices. The electronic device may identify a second external device to which the first external device transmits the AP information based on the set transmission path, and transmit the AP information and the control information to the first external device.

In this case, the electronic device may acquire information on a position of the plurality of external devices based on intensity of a signal received from each of the plurality of external devices, and set the transmission path based on the acquired information.

The electronic device may acquire, from an external server, information on a space in which each of the plurality of external devices belongs, and set the transmission path based on the acquired information.

The control information transmitted by the electronic device to the external device may be an instruction for the external device to transmit the AP information to any one other device, or may be an instruction to transmit the AP information to the plurality of other devices. In the latter case, the control information may include information about a plurality of other external devices to which the first external device should transmit the AP information.

The electronic device may transmit the control information for causing the first external device to transmit the AP information to the second external device and control information for causing the second external device to transmit the AP information to the third external device. For example, the instruction can be given to the second external device via the first external device to transmit the AP information to the third external device.

The electronic device may transmit, to the first external device, the AP information and the control information for causing the first external device to transmit the AP information to the second external device, and then may transmit, to the third external device, the AP information and the control information for causing the third external device to transmit the AP information to the fourth external device. For example, the electronic device may repeat transmission of AP information and control information, if necessary, until no device to which the AP information is to be transmitted remains.

The electronic device may include a display and display a UI including a list of the identified (searched) external devices for scanning, and so that the AP information is transmitted to the first external device and the second external device that are selected through the UI, the electronic device may transmit, to the first external device, the AP information and the control information for causing the first external device to transmit the AP information to the second external device.

The electronic device may receive information confirming the connection to the access point from the external devices. Such information may be transmitted to the electronic device by a direct communication method, or may be transmitted via an access point. Alternatively, the external devices may transmit information confirming that the external device is connected to the access point to the server, and the electronic device may receive such information from the server.

If it is confirmed that the external devices are connected to the access point, the electronic device may display a UI notifying the same to the user.

The electronic device may not only connect the external devices to the access point but also register the external devices to the server. The electronic device may transmit the server connection information to the external devices through the access point. The external devices that receive the server connection information may access the server.

According to the aforementioned embodiments of the disclosure, the time required to connect a plurality of devices to the access point may be reduced.

The various embodiments described above may be implemented in software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor 130 of the first electronic device 100. According to a software implementation, embodiments of the disclosure, such as the procedures and functions described herein may be implemented with separate software modules. Each of the above-described software modules may perform one or more of the functions and operations described herein.

The various example embodiments as described above may be implemented with software including instructions stored in the machine-readable storage media readable by a machine (e.g., a computer). A machine is a device which may call instructions from the storage medium and operate according to the called instructions, and may include the first electronic device 100 of the embodiments.

When an instruction is executed by a processor, the processor may perform functions corresponding to the instruction, either directly or under the control of the processor, using other components. The instructions may include a code generated by a compiler or executed by an interpreter. For example, the instructions stored in the storage medium may be executed by the processor and the aforementioned controlling method of the electronic device may be executed. For example, as the instructions stored in the storage medium are executed by the processor of the device (or electronic device), the controlling method of the electronic device that includes the acquiring the AP information to connect to the access point, scanning (searching) the external device to connect to the access point, and transmitting the AP information to the first external device and the control information for causing the first external device to transmit the AP information to the second external device may be performed.

The machine-readable storage medium may be provided in the form of a non-transitory storage medium. Here, "non-transitory" means that the storage medium does not include a signal and is tangible, but does not distinguish whether data is permanently or temporarily stored in a storage medium.

According to embodiments of the disclosure, a method disclosed herein may be provided in a computer program product. A computer program product may be traded between a seller and a purchaser as a commodity. A computer program product may be distributed in the form of a machine-readable storage medium (e.g., a CD-ROM) or distributed online through an application store (e.g., Play-Store™, AppStore™). In the case of on-line distribution, at least a portion of the computer program product may be stored temporarily or at least temporarily in a storage medium, such as a manufacturer's server, a server in an application store, a memory in a relay server, and the like.

Each of the components (for example, a module or a program) according to the embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations can be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling an electronic device, the method comprising:
    acquiring access point (AP) information to connect to an AP;
    scanning for a first external device that is to be connected to the AP;
    scanning for a second external device that is to be connected to the AP; and
    transmitting, to the first external device that is identified from the scanning, the AP information and control information for causing the first external device to transmit the AP information to the second external device identified from the scanning.

2. The method of claim 1, further comprising:
    setting a transmission path to transmit the AP information to a plurality of external devices that include the first external device and the second external device,
    wherein the transmitting comprises transmitting the AP information and the control information to the first external device by identifying the second external device to which the AP information is to be transmitted by the first external device based on the set transmission path.

3. The method of claim 2, wherein the setting of the transmission path comprises:

acquiring information on a position of the plurality of external devices based on an intensity of a signal that is received from each of the plurality of external devices; and setting the transmission path based on the acquired information.

4. The method of claim 2, wherein the setting of the transmission path comprises:

acquiring information on a space to which each of the plurality of external devices belongs from an external server; and setting the transmission path based on the acquired information.

5. The method of claim 4, wherein the first external device registers the second external device in an account of a specific user of the external server.

6. The method of claim 1, wherein the control information comprises information on a plurality of other external devices to which the AP information is to be transmitted by the first external device.

7. The method of claim 1, wherein the transmitting of the AP information and control information comprises:

transmitting, to the first external device, the AP information;

controlling information for causing the first external device to transmit the AP information to a second external device; and controlling information for causing the second external device to transmit the AP information to a third external device.

8. The method of claim 1, further comprising:

after transmitting the AP information and the control information to the first external device, transmitting, to a third external device, the AP information; and controlling information for causing a third external device to transmit the AP information to a fourth external device.

9. The method of claim 1, further comprising:

displaying a user interface (UI) including a list of at least one external device that is identified from the scanning, wherein the transmitting comprises, based on the first external device and the second external device being selected through the UI, transmitting the AP information and the control information to the first external device.

10. The method of claim 1, further comprising:

based on predetermined information being received from the first external device and the second external device through the access point after transmitting the AP information and the control information, displaying information indicating that the first external device and the second external device are connected to the access point.

11. The method of claim 1, further comprising:

based on predetermined information being received from the first external device and the second external device through the access point after transmitting the AP information and the control information, transmitting, to the first external device and the second external device, prestored server connection information through the access point.

12. The method of claim 1, wherein the AP information comprises at least one of a service set identifier (SSID), a security type, or an encryption type.

13. An electronic device comprising:

a communicator;

a memory configured to store at least one computer executable instruction; and at least one processor configured to execute the at least one computer executable instruction, wherein the at least one processor is further configured to:

acquire access point (AP) information to connect to an AP, scan for a first external device that is to be connected to the AP, scan for a second external device that is to be connected to the AP, and control the communicator to transmit, to the first external device that is identified from the scanning, the AP information and control information for causing the first external device to transmit the AP information to the second external device identified from the scanning.

14. The electronic device of claim 13, wherein the at least one processor is further configured to:

set a transmission path to transmit the AP information to a plurality of external devices that include the first external device and the second external device, and control the communicator to transmit the AP information and the control information to the first external device by identifying the second external device to which the AP information is to be transmitted by the first external device based on the set transmission path.

15. The electronic device of claim 14, wherein the at least one processor is further configured to:

acquire information on a position of the plurality of external devices based on an intensity of a signal that is received from each of the plurality of external devices, and set the transmission path based on the acquired information.

16. The electronic device of claim 14, wherein the at least one processor is further configured to:

acquire information on a space to which each of the plurality of external devices belongs from an external server, and set the transmission path based on the acquired information.

17. The electronic device of claim 13, wherein the control information comprises information on a plurality of other external devices to which the AP information is to be transmitted by the first external device.

18. The electronic device of claim 13, wherein the at least one processor is further configured to:

control the communicator to transmit, to the first external device, the AP information, control information for causing the first external device to transmit the AP information to the second external device, and control information for causing the second external device to transmit the AP information to a third external device.

19. The electronic device of claim 13, wherein the at least one processor is further configured to:

after transmitting the AP information and the control information to the first external device, control the communicator to transmit, to a third external device, the AP information, and control information for causing the third external device to transmit the AP information to a fourth external device.

20. The electronic device of claim 13, further comprising:
a display,
wherein the at least one processor is further configured to:
control the display to display a user interface (UI) including a list of at least one external device that is identified from the scanning, and
control the communicator to, based on the first external device and the second external device being selected through the UI, transmit the AP information and the control information to the first external device.

21. The electronic device of claim 13, further comprising:
a display,
wherein the at least one processor is further configured to, based on predetermined information being received from the first external device and the second external device through the AP after transmitting the AP information and the control information, control the display to display information indicating that the first external device and the second external device are connected to the AP.

22. The electronic device of claim 13, wherein the at least one processor is further configured to, based on predetermined information being received from the first external device and the second external device through the AP after transmitting the AP information and the control information, control the communicator to transmit, to the first external device and the second external device, prestored server connection information through the AP.

* * * * *